(12) United States Patent
Gekinozu

(10) Patent No.: US 10,574,075 B2
(45) Date of Patent: Feb. 25, 2020

(54) CONTROLLER FOR OPERATING PARALLEL CONVERTERS IN CONSTANT VOLTAGE, CONSTANT POWER AND CONSTANT CURRENT MODES TO CHARGE A BATTERY

(71) Applicant: FUJI ELECTRIC CO., LTD., Kawasaki-shi, Kanagawa (JP)

(72) Inventor: Masakazu Gekinozu, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 456 days.

(21) Appl. No.: 15/167,074

(22) Filed: May 27, 2016

(65) Prior Publication Data
US 2016/0276844 A1   Sep. 22, 2016

Related U.S. Application Data

(63) Continuation of application No. PCT/JP2014/002794, filed on May 27, 2014.

(51) Int. Cl.
*H02J 7/00* (2006.01)
*H02J 5/00* (2016.01)
*H02J 7/02* (2016.01)

(52) U.S. Cl.
CPC ............ *H02J 7/007* (2013.01); *H02J 5/00* (2013.01); *H02J 7/0052* (2013.01); *H02J 7/02* (2013.01); *H02J 2007/0059* (2013.01)

(58) Field of Classification Search
CPC .................................. H02J 7/007; H02J 5/00
(Continued)

(56) References Cited

U.S. PATENT DOCUMENTS

| 5,159,261 A | 10/1992 | Kim et al. |
| 5,768,117 A | 6/1998 | Takahashi et al. |

(Continued)

FOREIGN PATENT DOCUMENTS

| EP | 0660487 A2 | 6/1995 |
| EP | 2 228 882 A2 | 9/2010 |

(Continued)

OTHER PUBLICATIONS

Europe Patent Office, "Search Report for European Patent Application No. 14893026.6," dated Aug. 14, 2017.

(Continued)

*Primary Examiner* — Richard V Muralidar
(74) *Attorney, Agent, or Firm* — Manabu Kanesaka

(57) ABSTRACT

A battery charger is provided for charging the battery with the use of plural power converters, and the current balance control can be eliminated in the constant voltage charging operation. The battery charger includes the first to n-th power converters configured to convert the power supplied from the power supply and supply the converted power to the battery, and a charge controller configured to cause the power converters to perform a constant current charging operation, a constant power charging operation, and a constant voltage charging operation, to charge the battery. The charge controller causes the first to n-th power converters to operate in parallel in the constant current charging operation and the constant power charging operation, and causes one of the first to n-th power converters to solely operate in the constant voltage charging operation.

6 Claims, 9 Drawing Sheets

(58) Field of Classification Search
USPC .......................... 320/138, 140; 307/6, 58, 82
See application file for complete search history.

(56) References Cited

U.S. PATENT DOCUMENTS

| | | | |
|---|---|---|---|
| 2009/0160407 A1 | 6/2009 | Hwang | |
| 2011/0304298 A1* | 12/2011 | Gow | ..................... H02J 1/10 |
| | | | 320/107 |
| 2012/0038324 A1 | 2/2012 | Humphrey et al. | |

FOREIGN PATENT DOCUMENTS

| | | |
|---|---|---|
| JP | H06-245402 A | 9/1994 |
| JP | 2000-299136 A | 10/2000 |
| JP | 2009-153368 A | 7/2009 |
| JP | 2010-213499 A | 9/2010 |
| JP | 2011-176959 A | 9/2011 |
| JP | 2012-029480 A | 2/2012 |
| JP | 2012-157201 A | 8/2012 |
| JP | 2012-244866 A | 12/2012 |

OTHER PUBLICATIONS

PCT/ISA/237, "Written Opinion of the International Searching Authority for International Application No. PCT/JP2014/002794," dated Jul. 8, 2014.

PCT/IB/338, "Notification of Transmittal of Translation of the International Preliminary Report on Patentability or International Application No. PCT/JP2014/002794," dated Dec. 8, 2016.

PCT/IB/373, "International Preliminary Report on Patentability for International Application No. PCT/JP2014/002794," dated Nov. 29, 2016.

PCT, "International Search Report for International Application No. PCT/JP2014/002794".

* cited by examiner

CONTROLLER FOR OPERATING PARALLEL CONVERTERS IN CONSTANT VOLTAGE, CONSTANT POWER AND CONSTANT CURRENT MODES TO CHARGE A BATTERY

CROSS-REFERENCE TO RELATED APPLICATION

This is a continuation application of PCT International Application No. PCT/JP2014/002794 filed on May 27, 2014.

TECHNICAL FIELD

The present invention relates to a control technology of a battery charger.

BACKGROUND ART

As a conventional technique of operating plural power converters in parallel to supply the power to a load, the technique disclosed in Patent Literature 1 is given as an example. In this technique, to suppress the current concentration on a particular one of plural power supply circuits operating in parallel, the respective power supply circuits are controlled to balance their output currents.

Also, when a battery such as a lithium ion battery is charged with the use of the power converter conventionally, the power converter performs in an order of a constant current charging operation and a constant voltage charging operation (for example, see Patent Literature 2). Alternatively, the power converter performs in an order of the constant current charging operation, a constant power charging operation, and the constant voltage charging operation (for example, see Patent Literature 3).

Here, as illustrated in FIG. 10, the constant current charging operation is a charging operation with a charging current Iot being constant, and the constant power charging operation is a charging operation with a charging power (Pout=Vout×Iot) being constant. In addition, the constant voltage charging operation is a charging operation with a charging voltage Vout being constant. In other words, after the charging starts, the charging operation is performed efficiently in the order of the constant current charging operation and the constant power charging operation, and the charging operation is performed up to immediately before a limit value of the battery capacity while avoiding overcharging by performing the constant voltage charging operation at the end stage of charging.

CITATION LIST

Patent Literature

PLT1: JP 2012-244866 A
PLT2: JP 2012-157201 A
PLT3: JP 2010-213499 A

SUMMARY

Technical Problem

When plural power converters are made to perform the constant voltage charging operation to charge the battery, in order to balance the output currents of these power converters, control lines that acquire current detection results CT1 to CTn of the respective power supply circuits and a total current detection result CT0 of these currents, and a control circuit and a control line for comparing the current detection results are needed, as in the conventional technology.

Besides, in the above-described conventional technology, a single controller concentrically controls from the generation of a current instruction value used for balancing the currents to the generation of a control signal used for driving each supply circuit.

However, when the plural power converters are made to operate in parallel to charge the battery, a configuration is given as an example, as illustrated in FIG. 11, such that each of the power converters receives a current instruction value Iref, a power instruction value Pref, and a voltage instruction value Vref from the controller (not illustrated), and generates a control signal from each of output current detection results Io1 to Io3 and the output voltage detection results Vout of its own.

In the above configuration, in order to perform the constant voltage charging operation and to balance the output currents, power converters SMPS1 to SMPS3 respectively need current balance control units CBC1 to CBC3 each including a control circuit for comparing current detection results of the respective power converters, and control lines of supplying the output current detection results Io1 to Io3 to the respective power converters, as illustrated in FIG. 11, for example.

The inventors of the present invention have focused on the point, in particular, in the conventional configuration illustrated in FIG. 11, that when the constant current charging operation and the constant power charging operation are performed, the power converters are respectively capable of controlling their output currents from the output current detection results to match the current instruction values (i.e., power instruction values) from the controller, and hence the balance control of the output currents is not necessary. The inventors of the present invention have also focused on the point that when the constant voltage charging operation is performed, the power necessary for charging the battery can be smaller than the power necessary for the constant current charging operation and the constant power charging operation, and hence only a single power converter is capable of generating the power necessary for charging the battery.

Then, the inventors of the present invention have found out from the above-described focused points that in the constant voltage charging operation in which the output currents are not balanced, the balance control of the output currents can be eliminated by causing a single power converter of the plural power converters to operate solely.

The present invention has been made in view of the above circumstances, and has an object to provide a battery charger, which eliminates the balance control of the output currents in the constant voltage charging operation in charging the battery with the use of plural power converters.

Solution to Problem

<First Aspect> In order to achieve the above object, there is provided a battery charger in a first aspect including: a plurality of power converters configured to convert power supplied from a power supply, and to supply converted power to a battery; and a charge controller configured to cause the plurality of power converters to operate at least two charging operations selected from a constant current charging operation to keep a charging current constant, a constant power charging operation to keep a charging power constant, or a constant voltage charging operation to keep a charging voltage constant, to charge the battery, the at least two charging operations including at least the constant voltage charging operation. The charge controller is configured to cause the plurality of power converters to operate in parallel, in performing the at least two charging operations including either one of the constant current charging operation or the constant power charging operation, and the charge controller is configured to cause anyone of the plurality of power converters to solely operate in the constant voltage charging operation.

In such a configuration, it is possible to cause the plural power converters operate in parallel in the constant current charging operation and the constant power charging operation that need relatively large supply power. In addition, it is possible to cause one of the plural power converters to solely operate in the constant voltage charging operation that needs only relatively small supply power.

<Second Aspect> Further, according to the battery charger in a second aspect, in the configuration of the first aspect, the charge controller may be configured to output at least two instruction values corresponding to the at least two charging operations to the plurality of power converters to control charging operations of the plurality of power converters, the at least two instruction values including a current instruction value corresponding to the constant current charging operation, a power instruction value corresponding to the constant power charging operation, and a voltage instruction value corresponding to the constant voltage charging operation. Each of the plurality of power converters may include at least two control units corresponding to the at least two charging operations, the at least two control units being selected from: a constant current control unit configured to control the constant current charging operation such that an output current value from the constant current control unit matches the current instruction value output from the charge controller, based on the current instruction value from the charge controller and the output current value; a constant power control unit configured to control the constant power charging operation such that an output power value from the constant power control unit matches the power instruction value output from the charge controller, based on the power instruction value from the charge controller and the output power value; and a constant voltage control unit configured to control the constant voltage charging operation such that an output voltage value from the constant voltage control unit matches the voltage instruction value output from the charge controller, based on the voltage instruction value from the charge controller and the output voltage value.

In such a configuration, the plural power converters respectively receive inputs of any one of the current instruction value, the power instruction value, or the voltage instruction value from the charge controller. Then, it is made possible for any one of the constant current control unit, the constant power control unit, or the constant voltage control unit that corresponds to the instruction value that has been input to perform any one of the constant current charging operation, the constant power charging operation, or the constant voltage charging operation.

In other words, in the constant current charging operation, each of the plural power converters is capable of controlling the charging operation such that the output current value of its own matches the current instruction value. In addition, in the constant power charging operation, each of the plural power converters is capable of controlling the charging operation such that the output power value of its own calculated by the output current value of its own and the output voltage value matches the power instruction value. In this situation, the output voltage value (charging voltage value) is common to the power converters, respectively. Hence, in the constant power charging operation, each of the power converters is capable of outputting the common output current value depending on a change in the charging voltage value such that the output power value of its own matches the power instruction value. This configuration eliminates the need of balancing the output currents from the plural power converters in the constant current charging operation and the constant power charging operation.

<Third Aspect> Furthermore, according to the battery charger in a third aspect, in the configuration of the first or second aspect, the charge controller may be configured to replace one of the plurality of power converters to solely operate with another one of the plurality of power converters in turn for every predefined period, in the constant voltage charging operation for a charging period from a charging start to a charging end.

In such a configuration, the power converter that solely operates can be changed successively to another one as the predefined period passes, in the constant voltage charging operation.

<Fourth Aspect> Moreover, according to the battery charger in a fourth aspect, in the configuration of the first aspect, the charge controller may be configured to replace one of the plurality of power converters to solely operate with another one of the plurality of power converters in turn for every charging period from a charging start to a charging end.

In such a configuration, the power converter that solely operates can be changed successively to another one in the constant voltage charging operation, whenever one charging period ends.

<Fifth Aspect> Further, according to the battery charger in a fifth aspect, in the configuration of any one of the first to fourth aspects, the battery may be a lithium ion battery, and the charge controller may be configured to cause the plurality of power converters to perform in an order of the constant current charging operation and the constant voltage charging operation, or in another order of the constant current charging operation, the constant power charging operation, and the constant voltage charging operation, to charge the battery.

In such a configuration, it is possible to charge a lithium ion battery, in an order of the constant current charging operation and the constant voltage charging operation, or in another order of the constant current charging operation, the constant power charging operation, and the constant voltage charging operation. In addition, in the constant voltage charging operation, one of the plural power converters is capable of solely operating.

Advantageous Effects

According to the present invention, plural power converters operate in parallel in the constant current charging operation and the constant power charging operation that need relatively large charging power, and one of the of plural power converters solely operates in the constant voltage charging operation that needs relatively small charging power. Accordingly, when the plural power converters operate in parallel, the balance control of the output currents can be eliminated in the constant voltage charging operation in which the output currents are not balanced.

This configuration eliminates the dedicated control circuit or control line necessary for the current balance control in the constant voltage charging operation, and achieves an advantage of suppressing an increase in the cost for the current balance control. This configuration also achieves an advantage of reducing the power loss in the constant voltage charging operation as compared to the case where the plural power converters operate.

DESCRIPTION OF EMBODIMENTS

First Embodiment

Configuration

Figure 1:
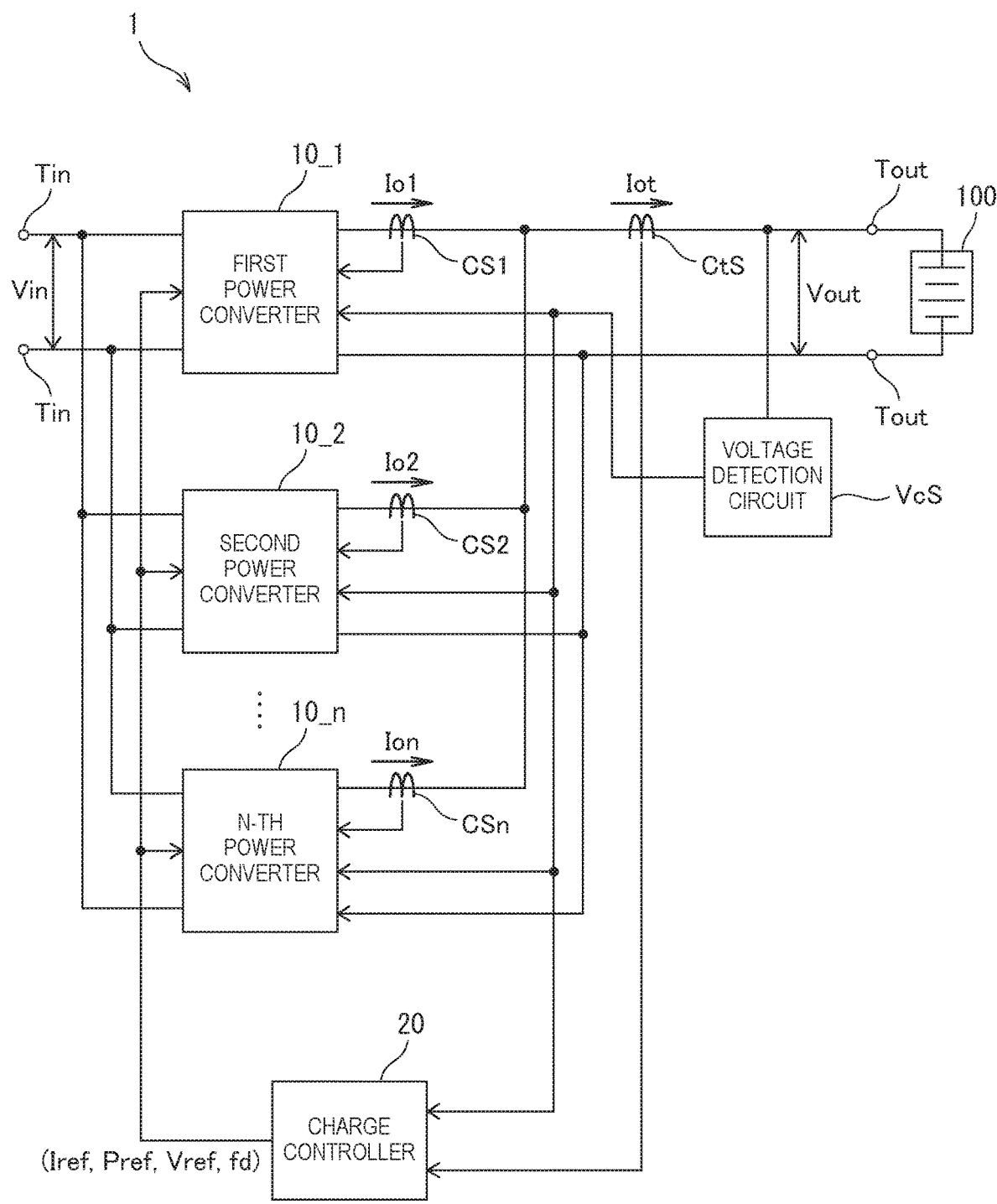
FIG. 1 is a block diagram of a whole configuration of a battery charger in a first embodiment of the present invention.

As illustrated in FIG. 1, a battery charger 1 in a first embodiment includes a first to an n-th power converters 10_1 to 10_2 (where n is a natural number of two or more) connected in parallel, a charge controller 20, a first to n-th current detection circuits CS1 to CSn, a charging current detection circuit CtS, and a voltage detection circuit VcS. It is to be noted that in an example of FIG. 1, three or more power converters are provided, but two converters including the first power converter 10_1 and the second power converter 10_2 may be provided. In the battery charger 1, the charge controller 20 is configured to control the charging operations of the first to n-th power converters 1_10 to 10_*n* to charge a battery 100 connected with output terminals. Although not illustrated, the power supply is connected to input terminals Tin. In the first embodiment, the battery 100 may be a lithium ion battery.

The first to n-th current detection circuits CS1 to CSn are respectively arranged between the first to n-th power converters 10_1 to 10_*n* and joining points of joining the output lines of the respective power converters and the output lines of the other power converters, and are circuits configured to detect output currents Io1 to Ion from the first to n-th power converters 10_1 to 10_*n*.

For example, the first current detection circuit CS1 is arranged between the first power converter 10_1 and a joining point of joining the output line of the first power converter 10_1 and the output lines of the second to n-th power converters 10_2 to 10_*n*.

Also, each of the first to n-th current detection circuits CS1 to CSn includes, for example, a shunt resistance having a minute resistance value and individually arranged between the first to n-th power converters 10_1 to 10_*n* and joining points of the output lines therefrom, and a current detection circuit configured to measure voltages applied at both ends of the shunt resistance, and to detect and output current from each of the power converters. The present embodiment is not limited to the use of the shunt resistance. Any other configuration may be applicable, and, for example, Hall elements such as DC current transformers (DCCT) may be used.

The charging current detection circuit CtS is a circuit arranged between the joining points of the output lines of the first to n-th power converters 10_1 to 10_*n* and the battery 100, and is configured to detect a charging current Iot (Iot=Io1+Io2+ . . . +Ion) of the battery 100.

The charging current detection circuit CtS includes, for example, a shunt resistance having a minute resistance value arranged between a joining point of the output lines of the first to n-th power converters 10_1 to 10_*n* and the battery 100, and a current detection circuit configured to measure voltages applied at both ends of the shunt resistance and detect a charging current. The present embodiment is not limited to the use of the shunt resistance. Any other configuration may be applicable, and for example, Hall elements such as DC current transformers (DCCT) may be used.

The voltage detection circuit VcS is arranged between the charging current detection circuit CtS and the battery 100, and is a circuit configured to detect an output voltage (charging voltage) Vout from each power converter.

Each of the first to n-th power converters 10_1 to 10_*n* includes a power conversion circuit configured to convert the power input from the power supply through the input terminal Tin. The power conversion circuit is different in configuration depending on the type of the power supply connected to the input terminal Tin. For example, when the power supply is an Alternating Current power supply, the power conversion circuit includes an AC/DC converter configured to convert the AC power into the DC power, whereas when the power supply is a Direct Current power supply, the power conversion circuit includes a DC/DC converter configured to convert the DC power into the DC power.

In the first embodiment, the power supply can be the AC power supply (for example, a commercial power supply), and the power conversion circuit can be the AC/DC converter.

In addition, the first to n-th power converters 10_1 to 10_*n* perform the constant current charging operation, the constant power charging operation, and the constant voltage charging operation based on a current instruction value Iref, a power instruction value Pref, a voltage instruction value Vref, and a drive instruction value fd from the charge controller 20, to charge the battery 100.

The charge controller 20 is configured to monitor the output voltage Vout detected by the voltage detection circuit VcS, and to change the type of the charging operation depending on the size of the output voltage Vout appropriately, so as to control the charging operation of charging the battery 100 with use of the first to n-th power converters 10_1 to 10_n.

In the first embodiment, the charge controller 20 is configured to cause the first to n-th power converters 10_1 to 10_n to perform three kinds of charging operations including the constant current charging operation, the constant power charging operation, and the constant voltage charging operation.

Therefore, the charge controller 20 outputs the current instruction value Iref in performing the constant current charging operation, the power instruction value Pref in performing the constant power charging operation, and the voltage instruction value Vref in performing the constant voltage charging operation to a predetermined power converter of the first to n-th power converters 10_1 to 10_n.

In addition, the charge controller 20 outputs the drive instruction value fd to control drive states of the first to n-th power converters 10_1 to 10_n to the first to n-th power converters 10_1 to 10_n.

Here, the drive instruction value fd is an instruction value that is set such that the drive instruction value fd "0" drives the power converter, whereas the drive instruction value fd "1" stops driving of the power converter.

In other words, when the drive instruction value fd "0" is input, the first to n-th power converters 10_1 to 10_n are in a driving state to perform the charging operation in accordance with the instruction value, whereas when the drive instruction value fd "1" is input, the first to n-th power converters 10_1 to 10_n are in a stop state to stop the charging operation.

Configuration of Power Converter

Next, specific configurations of the first to n-th power converters 10_1 to 10_n will be described based on FIG. 2A and FIG. 2B.

Hereinafter, when it is not necessary to distinguish the first to n-th power converters 10_1 to 10_n, "power converter 10" will be simply used in some cases. Similarly, the first to n-th current detection circuits CS1 to CSn will be referred to as "current detection circuit CS" in some cases. Similarly, the detection currents Io1 to Ion of the first to n-th current detection circuits CS1 to CSn will be referred to as "output current Io" in some cases.

Figure 2A:
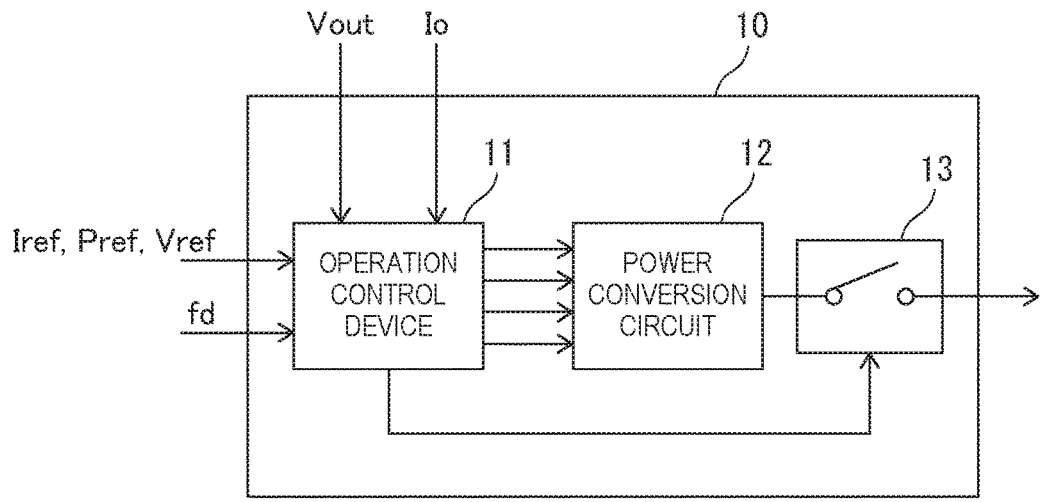
FIG. 2A is a block diagram of a configuration of a power converter.

As illustrated in FIG. 2A, the power converter 10 includes an operation control device 11, a power conversion circuit 12, and an output cutoff circuit 13.

The operation control device 11 is configured to generate a drive signal for causing the power conversion circuit 12 to perform the constant current charging operation, the constant power charging operation, or the constant voltage charge based on any one of the current instruction value Iref, the power instruction value Pref, or the voltage instruction value Vref, which has been input from the charge controller 20, and the drive instruction value fd. Then, the operation control device 11 outputs the generated drive signal to the power conversion circuit 12.

In addition, when the drive instruction value fd is "0", the operation control device 11 outputs the drive signal in accordance with each charging operation to the power conversion circuit 12, based on the drive instruction value fd from the charge controller 20. On the other hand, when the drive instruction value fd is "1", the operation control device 11 outputs a drive signal of stopping the driving to the power conversion circuit 12.

The power conversion circuit 12 includes an AC/DC converter, in the first embodiment. The AC/DC converter includes a rectification circuit configured to convert the AC power supplied from the AC power supply connected to the input terminal Tin into the DC power, and a DC/DC converter of, for example, an insulating type, configured to convert the DC input from the rectification circuit into a DC output. The DC/DC converter includes, for example, an inverter circuit of full bridge, a transformer into which the AC output from the inverter circuit is input, and a rectification circuit configured to rectify the AC output from the transformer.

In such a configuration, the power conversion circuit 12 is configured such that a switching element (e.g., field effect transistor) included in the inverter circuit is controlled to be driven by the drive signal from the operation control device 11. Accordingly, the DC power supplied from the rectification circuit on the input side is converted into the AC power depending on the drive content based on the drive signal, and the AC power is rectified by the rectification circuit on the output side and is converted into the power (DC power) of charging the battery 100. In other words, the power conversion circuit 12 is controlled to be driven by the drive signal from the operation control device 11, and outputs the DC power to satisfy an operation condition of the constant current charging operation, the constant power charging operation, or the constant voltage charging operation.

The output cutoff circuit 13 is arranged between the power conversion circuit 12 and an output terminal Tout, and is configured to cut off an electrical connection between the power conversion circuit 12 and the battery 100 connected with the output terminal Tout at the time of an cutoff operation. In addition, the output cutoff circuit 13 is configured with, for example, a field effect transistor. It is to be noted that the output cutoff circuit 13 is not limited to a semiconductor relay including the field effect transistor, and may include another semiconductor element. The output cutoff circuit 13 is not limited to the semiconductor relay, and may be a mechanical relay, a hybrid relay, or the like.

Figure 2B:
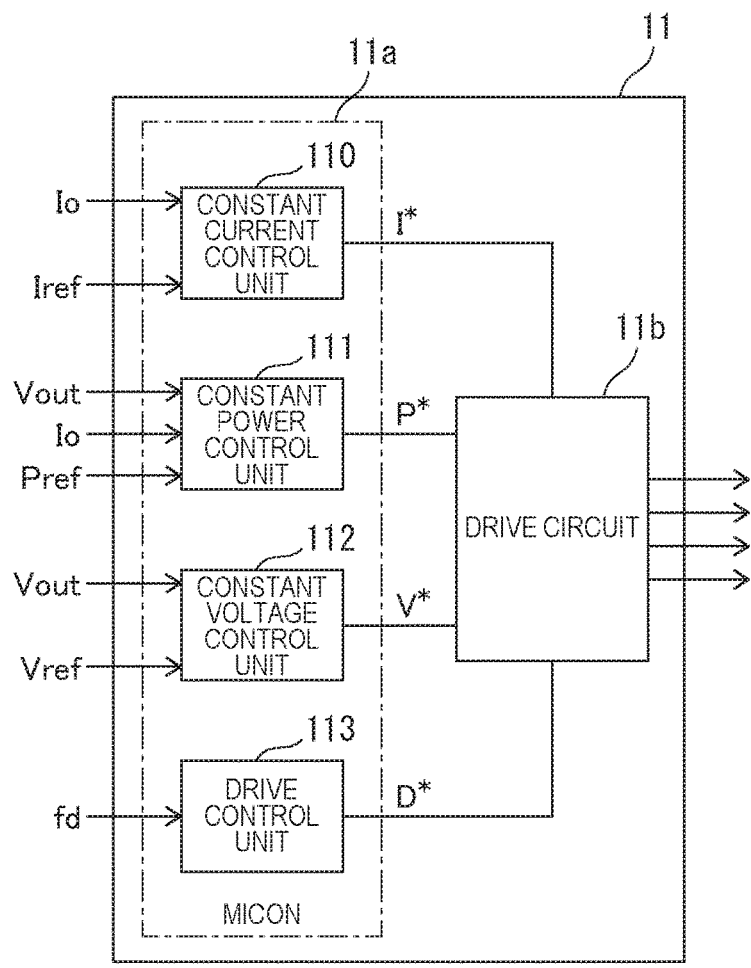
FIG. 2B is a block diagram of a detailed configuration of an operation control device.

As illustrated in FIG. 2B, the operation control device 11, includes a microcomputer 11a (hereinafter, referred to as "micon 11a"), and a drive circuit 11b.

The micon 11a is not illustrated, but includes an A/D converter, a processor, and a memory storing various data, such that the A/D converter converts analog input signals from various sensors into digital signals, and the processor performs the operation process on digital values indicated by the digital signals to calculate various control instruction values. Then, the micon 11a outputs the calculated control instruction value to the drive circuit 11b.

To be specific, the current instruction value Iref, the power instruction value Pref, the voltage instruction value Vref, and the drive instruction value fd, which are digital signals output from the charge controller 20, are input into the micon 11a. In addition, an output current Io that is an analog signal from the current detection circuit CS and an output voltage Vout that is an analog signal from the voltage detection circuit VcS are input into the micon 11a.

The micon 11a converts the output current value Io and the output voltage value Vout that are analog through the A/D converter into the output current value Io and the output voltage value Vout that are digital. Then, the micon 11a operates a control instruction value corresponding to each of the various charging operations based on the output current value Io and the output voltage value Vout, and the current instruction value Iref, the power instruction value Pref, the voltage instruction value Pref, and the drive instruction value fd, which are supplied from the charge controller 20.

In addition, the micon 11a includes, as illustrated in FIG. 2B, a constant current controller 110, a constant power controller 111, a constant voltage controller 112, and a drive controller 113, as functional configuration units configured to generate the control instruction value corresponding to each of the various charging operations. Here, each function of these functional configuration units is achieved on a processor by carrying out a program stored beforehand in the memory.

In other words, the micon 11a carries out a process of the constant current controller 110 in response to an input of the current instruction value Iref, carries out a process of the constant power controller 111 in response to an input of the power instruction value Pref, and carries out a process of the constant voltage controller 112 in response to an input of the voltage instruction value Vref. In addition, the micon 11a carries out a process of the drive controller 113 in response to an input of the drive instruction value fd.

The constant current controller 110 carries out, for example, a PI control operation or a PID control operation based on the current instruction value Iref and the output current value Io, to calculate a control instruction value I* to control driving of the power conversion circuit 12 so that the output current value Io from the power conversion circuit 12 matches the current instruction value Iref. Then, the constant current controller 110 outputs the control instruction value I* that has been operated to the drive circuit 11b.

The constant power controller 111 firstly multiplies the output voltage value Vout by the output current value Io to obtain an output power value Pout. Then, the constant power controller 111 performs, for example, the PI control operation or the PID control operation based on the output power value Pout and the power instruction value Pref to obtain a control instruction value P* to control driving of the power conversion circuit 12 so that the output power Pout from the power conversion circuit 12 matches the power instruction value Pref. Then, the constant power controller 111 outputs the control instruction value P* that has been obtained to the drive circuit 11b.

The constant voltage controller 112 performs, for example, the PI control operation or the PID control operation based on the voltage instruction value Vref and the output voltage value Vout to obtain the control instruction value V* to control driving of the power conversion circuit 12 so that the output voltage value Vout from the power conversion circuit 12 matches the voltage instruction value Vref. Then, the constant voltage controller 112 outputs the control instruction value V* that has been obtained to the drive circuit 11b.

The drive controller 113 outputs to the drive circuit 11b a control instruction value D* to cause the power conversion circuit 12 to normally operate, when determining that the input drive instruction value fd is "0". On the other hand, the drive controller 113 outputs to the drive circuit 11b the control instruction value D* to stop the power conversion circuit 12, when determining that the input drive instruction value fd is "1".

In the first embodiment, here, the switching element included in the inverter circuit of the power conversion circuit 12 is a field effect transistor, and the inverter circuit having a full bridge configuration includes two switching arms, each of which includes the two field effect transistors connected in series, are connected in parallel. Then, the inverter circuit with such a configuration is driven by a gate drive signal corresponding to a predefined drive method such as a phase shift method or a pulse width modulation (PWM) method, for example.

Also, any of the control instruction values I*, P*, or V* can be a voltage instruction value to form a gate drive signal from a carrier signal.

The drive circuit 11b is not illustrated, but includes a signal generation circuit configured to generate a carrier signal of triangular wave, and a drive signal formation circuit configured to form gate drive signals for the inverter circuit and the output cutoff circuit 13 based on the control instruction value and the carrier signal.

In receipt of any one of the control instruction value I*, P*, or V*, and the control instruction value D*, the drive circuit 11b forms a drive signal for the normal control, when the control instruction value D* is a value for the normal control (e.g., 0).

To be specific, the drive signal formation circuit forms four gate drive signals based on any one of the control instruction value I*, P*, or V* that has been input, and the carrier signal. Then, the drive signal formation circuit outputs the four gate drive signals that have been formed to the inverter circuit of the power conversion circuit 12. Further, in response to an input of the control instruction value D* "0", the drive signal formation circuit forms one gate drive signal (the gate drive signal of high level) to make the output cutoff circuit 13 electrically conductive. Then, the drive signal formation circuit outputs the one gate drive signal of high level that has been formed to the output cutoff circuit 13.

On the other hand, when the control instruction value D* in which a value (e. g., "1") to stop the power conversion circuit 12 is set is input into the drive circuit 11b, the drive signal formation circuit forms four gate drive signals of low level regardless of an input of another control instruction value. The drive signal formation circuit outputs the four gate drive signals of low level that have been formed to the inverter circuit. Further, the drive signal formation circuit forms one gate drive signal (the gate drive signal of low level) to cut off the output cutoff circuit 13. Then, the drive signal formation circuit outputs the one gate drive signal of low level that has been formed to the output cutoff circuit 13. Accordingly, driving of the inverter circuit is stopped, and in addition, the electrical connection between the power conversion circuit 12 and the battery 100 is cut off.

Configuration of Charge Controller

Next, a specific configuration of the charge controller 20 will be described based on FIG. 3.

Figure 3:
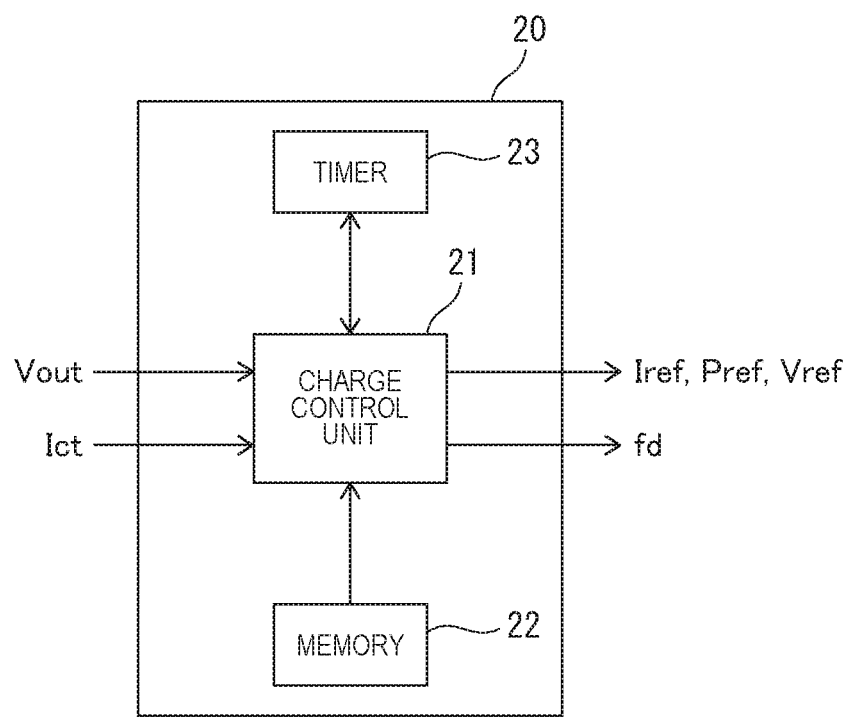
FIG. 3 is a block diagram of an example of a specific configuration of a charge controller.

The charge controller 20 includes a charge control unit 21, a memory 22, and a timer 23, as illustrated in FIG. 3.

The charge control unit 21 includes a microcomputer, and controls the charging operation of charging the battery 100 by use of the first to n-th power converters 10_1 to 10_n based on the output voltage Vout from the voltage detection circuit VcS, and the charging current Iot from the charging current detection circuit CtS.

It is to be noted that the charge control unit 21 includes an A/D converter configured to convert an output voltage value Vout and a charging current value Iot that are analog into the output voltage value Vout and the charging current value Iot that are digital. Then, based on digital values after the conversion the A/D converter carries out the charging operation control process.

Specifically, the charge control unit 21 charges with a relatively large charging current (e.g., the maximum current that can be supplied) at an early stage of charging, and the first to n-th power converters 10_1 to 10_n operate in parallel in the constant current charging operation. Further, the charge control unit 21 charges with a relatively large charging power (e.g., the maximum power that can be supplied) from the middle stage of charging, and the first to n-th power converters 10_1 to 10_n operate in parallel in the constant power charging operation. Furthermore, since only a small charging power is necessary at the end stage of charging, any one of the first to n-th power converters 10_1 to 10_n solely operates in the constant voltage charging operation.

Also, in performing the constant current charging operation, the charge control unit 21 outputs the current instruction value Iref to the first to n-th power converters 10_1 to 10_n, and in addition, outputs the drive instruction value fd "0" to the first to n-th power converters 10_1 to 10_n. Further, in performing the constant power charging operation, the charge control unit 21 outputs the power instruction value Pref to the first to n-th power converters 10_1 to 10_n, and in addition, outputs the drive instruction value fd "0" to the first to n-th power converters 10_1 to 10_n.

Here, in performing the constant current charging operation and the constant power charging operation, when the first to n-th power converters 10_1 to 10_n operate in parallel, the charge controller 20 is configured to cause each of the power converters to supply the charging current equally to the battery 100. Therefore, for example, in the constant current charging operation, the charge control unit 21 outputs a current instruction value Iref (=It/n) to be 1/n the constant charging current value It, which is a target value, to the first to n-th power converters 10_1 to 10_n. Similarly, in the constant power charging operation, the charge control unit 21 outputs the power instruction value Pref (=Pt/n) to be 1/n the constant charging power value Pt, which is a target value, to the first to n-th power converters 10_1 to 10_n.

On the other hand, in performing the constant voltage charging operation, the charge controller 20 causes any one of the first to n-th power converters 10_1 to 10_n to solely operate and supply the charging current for charging the battery 100, and applies a load onto such a power converter to solely supply the power.

In other words, the charge controller 20 outputs the voltage instruction value Vref, which is a target constant voltage value, to the power converter to solely operate, and in addition, outputs the drive instruction value fd "0" to the power converter. In addition, the charge controller 20 outputs the drive instruction value fd "1" to the other power converters of the first to n-th power converters 10_1 to 10_n, except for the power converter to solely operate.

In addition, in the charge controller 20 in the first embodiment, the timer 23 measures an operation period Td of the power converter solely operating in a constant voltage charging operation period Tv in one charging period from the start to the end of charging (full charge). When the operation period Td is equal to or longer than a predefined period Ts, the constant voltage charging operation of the power converter solely operating currently is replaced with another power converter.

In other words, the charge controller 20 outputs the drive instruction value fd "1" to the power converter solely operating currently, and outputs the voltage instruction value Vref and the drive instruction value fd "0" to another power converter that will operate next.

It is to be noted that in the first embodiment, the first to n-th power converters 10_1 to 10_n solely operate in a predefined order successively in a single constant voltage charging operation period Tv.

Such a predefined charging order is defined beforehand is association with identification information of each power converter, as order information, and the order information is stored in the memory 22.

Further, in the constant voltage charging operation, information on the power converter currently operating is also stored in the memory. Whenever the power converter is replaced, the information on the power converter currently operating is updated. It is to be noted that until all the first to n-th power converters 10_1 to 10_n operate successively and take turn, a successive order is set so that the power converter that has once operated solely should not be selected again.

In addition, the charge control unit 21 determines whether the voltage of the battery 100 (hereinafter, referred to as "battery voltage") is abnormal based on the output voltage value Vout. Then, when determining that the battery voltage is abnormal, the charge control unit 21 outputs the drive instruction value fd "1" to all of the first to n-th power converters 10_1 to 10_n.

The memory 22 includes a ROM in which programs and data necessary for the charge control process to be performed by the charge control unit 21 is stored, and a non-volatile memory in which various data necessary for carrying out the programs are temporarily stored.

To be specific, programs for the charging operation control process, the current instruction value Iref, the power instruction value Pref, the voltage instruction value Vref, the order information, the predefined period Ts, and the like are stored in the ROM.

In addition, various data stored in the ROM are read and temporarily stored, and the information on the power converter solely operating (i.e., operation information) is stored in the non-volatile memory.

Charging Operation Control Process

Next, a process procedure of the charging operation control process to be performed by the charge controller 20 will be described based on FIG. 4.

Figure 4:
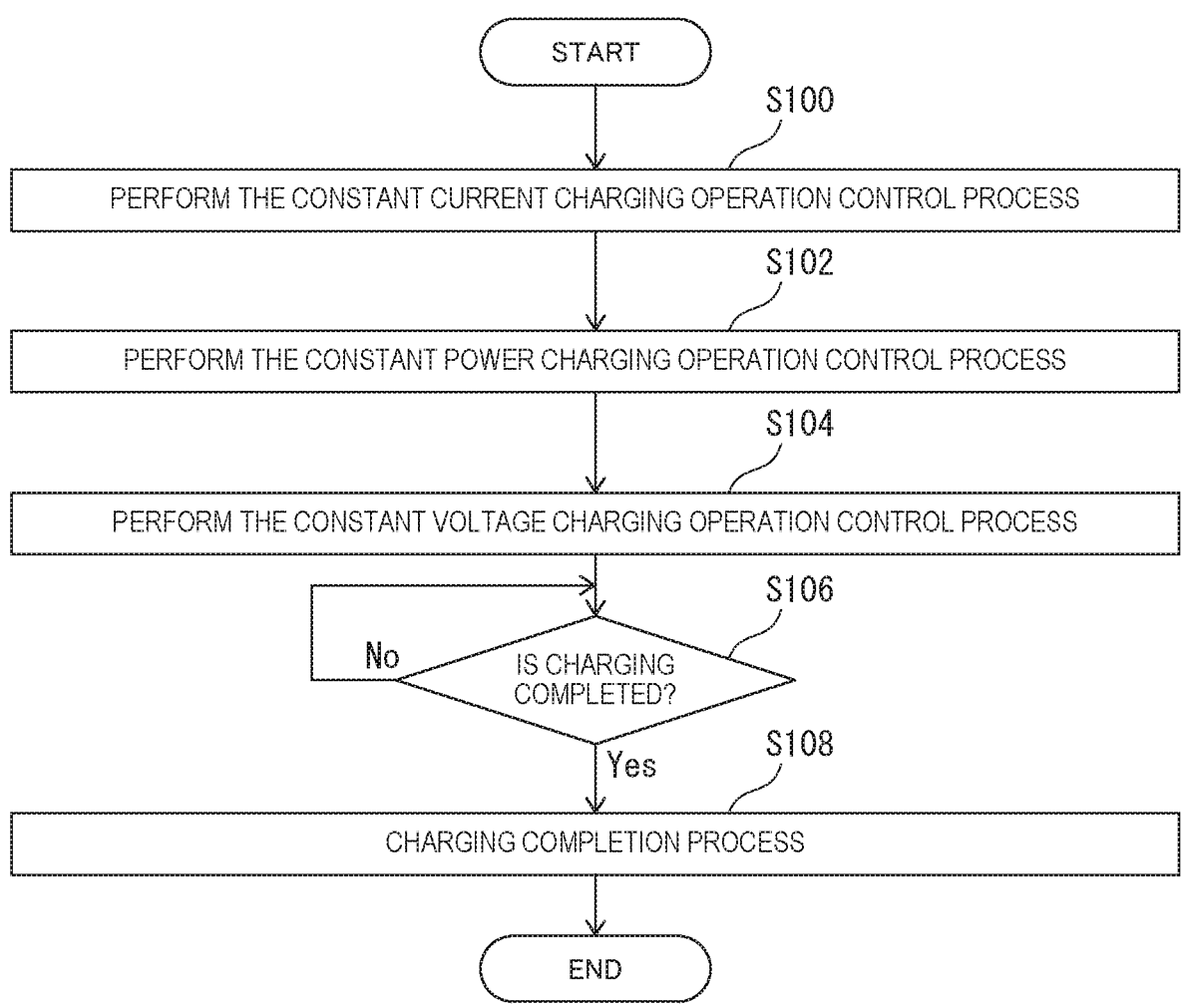
FIG. 4 is a flow chart of an example of a process procedure of a charging operation control process.

When the charge control unit 21 starts performing the charging operation control process, as illustrated in FIG. 4, processing goes to step S100 firstly.

In step S100, the charge control unit 21 performs the constant current charging operation control process, and goes to step S102.

Here, the constant current charging operation control process is a process to output the current instruction value Iref and the drive instruction value fd "0" to the first to n-th power converters 10_1 to 10_n. Accordingly, the first to n-th power converters 10_1 to 10_n perform the constant current charging operation.

In step S102, the charge control unit 21 performs the constant power charging operation control process, and processing goes to step S104.

Here, the constant power charging operation control process is a process to output the power instruction value Pref and the drive instruction value fd "0" to the first to n-th power converters 10_1 to 10_n. Accordingly, the first to n-th power converters 10_1 to 10_n perform the constant power charging operation.

In step S104, the charge control unit 21 performs the constant voltage charging operation control process, and processing goes to step S106.

In step S106, the charge control unit 21 determines whether charging is completed. When the charge control unit 21 determines that the charging is completed (Yes), processing goes to step S108. When the charge control unit 21 determines that the charging is not completed (No), the determination process is repeated until the charging is completed.

When processing goes to step S108, the charge control unit 21 performs a charging completion process to end a series of processes.

To be specific, the charging completion process is a process of outputting the drive instruction value fd "1" to the power converter performing the constant voltage charging operation, and continuously outputting the drive instruction value fd "1" to the other power converters.

Constant Voltage Charging Operation Control Process

Next, a process procedure of the constant voltage charging operation control process to be performed in step S104 will be described based on FIG. 5.

Figure 5:
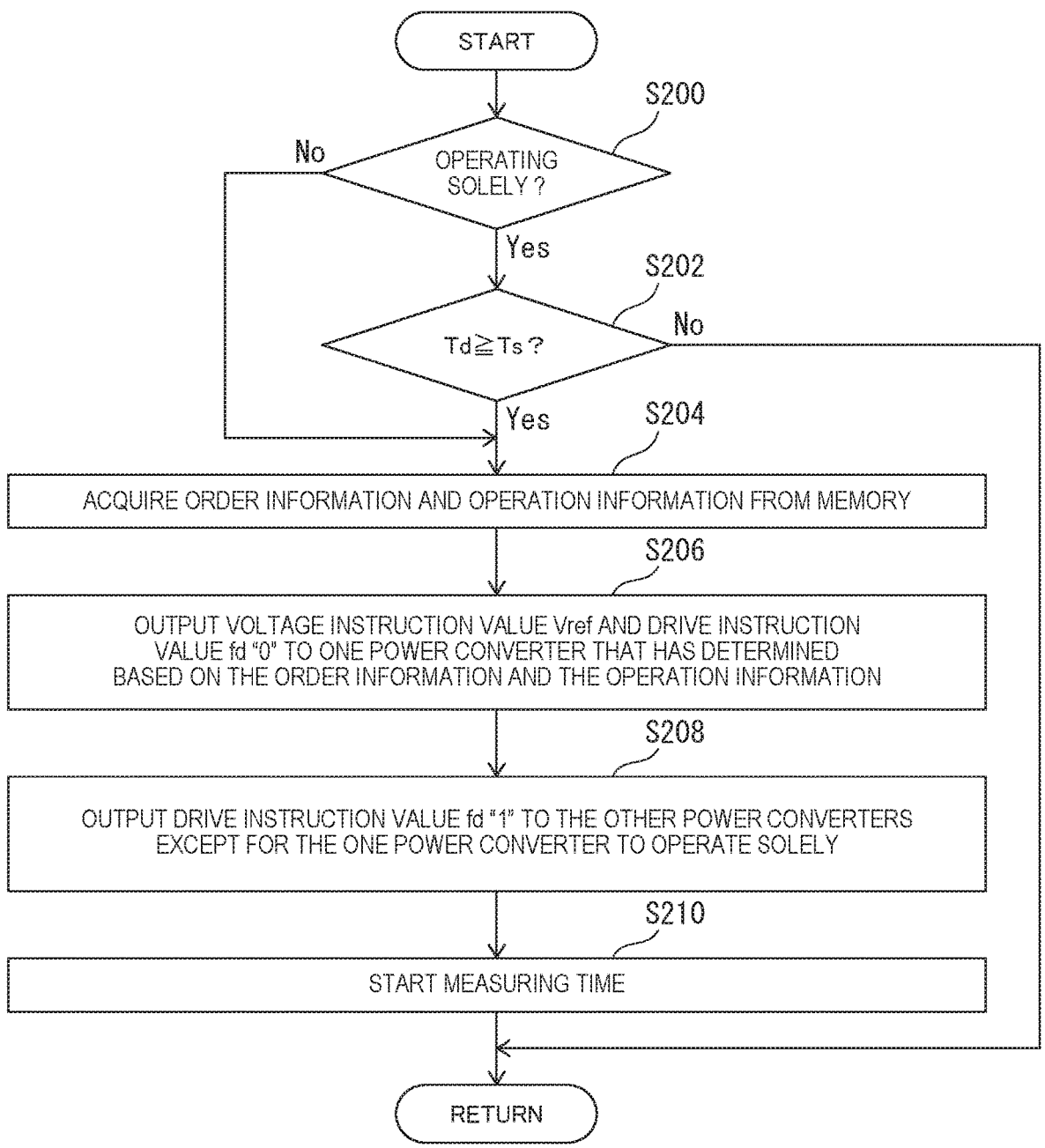
FIG. 5 is a flow chart of an example of a process procedure of a constant voltage charging operation control process in the first embodiment of the present invention.

In step S104, when the constant voltage charging operation control process is performed, as illustrated in FIG. 5, processing goes to step S200 firstly.

In step S200, the charge control unit 21 determines whether any one of the first to n-th power converters 10_1 to 10_n is solely operating the constant voltage charging operation. Then, when the charge control unit 21 determines that any one of the power converters is solely operating (Yes), processing goes to step S202. When the charge control unit 21 determines that any one of the power converters is not solely operating (No), processing goes to step S204.

When processing goes to step S202, the charge control unit 21 determines whether the operation period Td of the constant voltage charging operation is equal to or longer than a predefined period Ts based on the counted value of the timer 23. When the charge control unit 21 determines that the operation period Td of the constant voltage charging operation is equal to or longer than the predefined period Ts (Yes), processing goes to step S204. When the charge control unit 21 determines that the operation period Td of the constant voltage charging operation is not equal to or longer than the predefined period Ts (No), the charge control unit 21 ends a series of process, and returns to an original process.

When processing goes to step S204, the charge control unit 21 reads the order information and the operation information from the memory 22, and processing goes to step S206.

In step S206, the charge control unit 21 determines a power converter to solely operate from the first to n-th power converters 10_1 to 10_n based on the order information and the operation information acquired in step S204. Then, the charge control unit 21 outputs the voltage instruction value Vref and the drive instruction value fd "0" to the determined power converter to solely operate. In addition, when there is a power converter solely operating currently, the charge control unit 21 outputs the drive instruction value fd "1" to the power converter solely operating currently, and then processing goes to step S208.

Here, the charge control unit 21 determines another power converter, which is a power converter that should operate next indicated by the operation information defined in the order information, to be the next power converter to operate solely.

In step S208, the charge control unit 21 outputs the drive instruction value fd "1" to the other power converters except for the power converter to operate solely next determined in step S206, from the first to tenth power converters 10_1 to 10_n. Then, processing goes to step S210.

In step S210, the charge control unit 21 updates the identification information of the power converter operating solely stored in the memory 22, starts the measurement of time by the timer 23 (resets the timer 23), ends a series of process, and returns to the original process.

Operation

Hereinafter, an operation of the battery charger 1 in the first embodiment will be described by referring to FIG. 1 to FIG. 5 and FIG. 10, based on FIG. 6.

Here, the battery 100 is a lithium ion battery for a vehicle, for example, and the power supply is a household AC power supply, for example. The lithium ion battery for the vehicle includes plural (e.g., dozens to hundreds) battery blocks connected in series, for example, and each of the battery blocks includes, for example, dozens of lithium ion battery cells (each having an electromotive force of about 3.7 V, for example) connected in parallel.

In addition, three power converters are provided including the first to third power converters 10_1 to 10_3, for example.

When the AC power supply is connected to the input terminal Tin, the charge controller 20 starts the charging operation control process. The charge controller 20 firstly performs the constant current charging operation control process (step S100).

Here, with setting the target constant charging current to 30 A, the charge controller 20 outputs the current instruction value Iref (30 A/3(converters)=10 A) and the drive instruction value fd "0" to the first to third power converters 10_1 to 10_3.

Accordingly, the first to third power converters 10_1 to 10_3 control driving of the inverter circuits of the power conversion circuits 12, so that the output currents Io1 to Io3 respectively match the current instruction value Iref (10A). In other words, the constant current charging operations of the three power converters are performed in parallel. Thus, as illustrated in the constant current charging operation period of FIG. 10, the battery 100 is charged with the constant current value (30 A). It is to be noted that the first to third power converters 10_1 to 10_3 are respectively controlled to output the common output currents (10 A), and hence the output currents are balanced.

Figure 10:
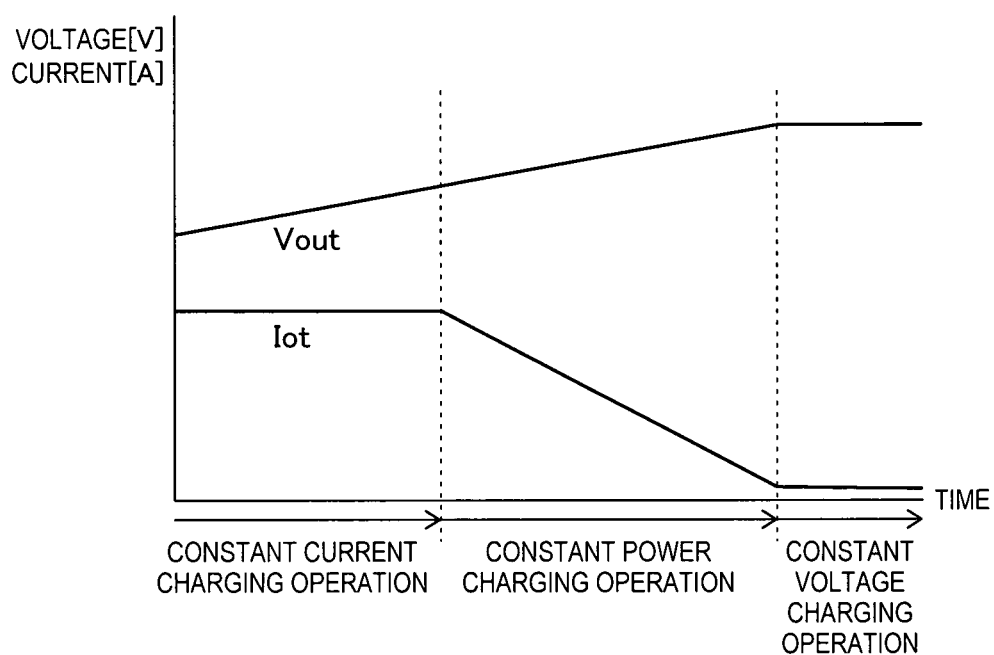
FIG. 10 is a view of an example of relationships between a charging voltage and a charging current in the charging operation in an order of the constant current charging operation, the constant power charging operation, and the constant voltage charging operation.
Figure 11:
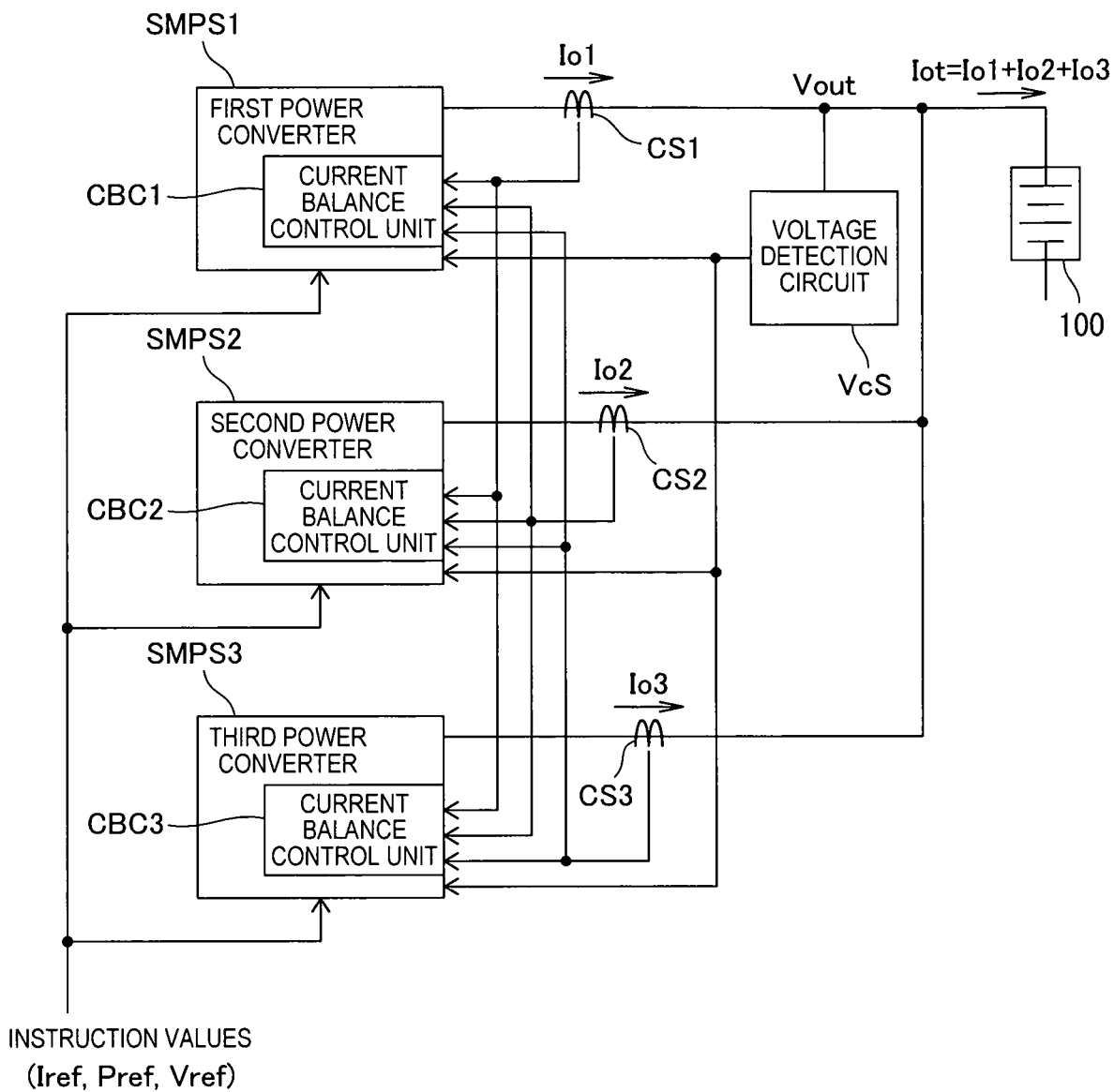
FIG. 11 is a block diagram of a configuration example of a conventional battery charger including plural power converters.

When the constant current charging operation is performed in this way, as illustrated in FIG. 10, the battery is charged with the charging current being kept constant (30 A), and the output voltage Vout increases as the time passes. When the constant current charging operation control process ends, the charge controller 20 performs the constant power charging operation control process next (step S102).

Here, with setting the target constant charging power to 3 kW, the charge controller 20 outputs the power instruction value Pref (=3 kW/3(converters)=1 kW) and the drive instruction value fd "0" to the first to third power converters 10_1 to 10_3.

Accordingly, the first to third power converters 10_1 to 10_3 control driving of the inverter circuits of the power conversion circuits 12, so that the output powers Po1 to Po3 respectively correspond to the power instruction value Pref (1 kW). In other words, the three power converters perform the constant power charging operations in parallel.

Specifically, the first to third power converters 10_1 to 10_3 respectively control their output currents Io1 to Io3 in accordance with an increase in the output voltage Vout, so that the respective output powers Po correspond to the power instruction value Pref. Accordingly, the battery 100 is charged with the constant charging power (3 kW). It is to be noted that the first to third power converters 10_1 to 10_3 respectively control their output currents so that the common power instruction value Pref corresponds to the common output voltage Vout, and hence the output currents are balanced.

When the constant power charging operation is performed in this way, the battery is charged with the charging power being kept constant. As illustrated in FIG. 10, the output voltage Vout increases as the time passes, and the charging current Iot decreases with an increase in the output voltage Vout. Then, when the constant power charging operation control process ends, the charge controller 20 performs the constant voltage charging operation control process next (step S104).

When the constant voltage charging operation control process starts, and the charge controller 20 determines that there is no power converter solely operating currently in the constant voltage charging operation (No in step S200), the charge controller 20 reads the order information and the operation information from the memory 22 (step S204). The charge controller 20 determines the power converter that has previously performed the constant voltage charging operation from the operation information, and determines a power converter to solely operate next from the order information. Here, the order information is predetermined, as illustrated in FIG. 6, such that a single constant voltage charging operation period Tv is divided into three periods equally, the first power converter 10_1 solely operates a first period tv1, the second power converter 10_2 solely operates a second period tv2, and the third power converter 10_3 solely operates a third period tv3.

In this example, the constant voltage charging operation period Tv is divided into three, the set period Ts satisfies "Ts=tv1=tv2=tv3". In addition, the constant voltage charging operation period Tv is predicted from, for example, other information acquired from the output voltage Vout or the battery 100, and is then set. It is to be noted that when the constant voltage charging operation period Tv cannot be divided equally, only any one of the set period can be shorter or longer. For example, "Ts=tv1=tv2" is set and tv3 is set for a period until the charging ends. In such a case, for example, the operation order can be set such that the power converter having a different operation period is replaced in turn.

The first constant voltage charging operation period Tv is to be performed by a power converter to solely operate for the first time, and hence the charge controller 20 determines the first power converter 10_1 to solely operate this time. Then, the charge controller 20 outputs the voltage instruction value Vref (e. g., 100 V) and the drive instruction value fd "0" to the first power converter 10_1 (step S206). In addition, the charge controller 20 outputs the drive instruction value fd "1" to the second and third power converters 10_2 and 10_3 (step S208).

Further, the charge controller 20 starts measuring the operation period Td of the first power converter 10_1, and in addition, updates the current operation information (here, the identification information on the power converter solely operating) with the identification information on the first power converter 10_1.

Accordingly, the first power converter 10_1 controls driving of the inverter circuit of the power inverter circuit 12, such that the output voltage Vout matches the voltage instruction value Vref (100 V).

On the other hand, in response to an input of the drive instruction value fd "1", the second and third power converters 10_2 and 10_3 output the gate drive signals of low level to all the field effect transistors of the inverter circuits of the power conversion circuits 12 to stop driving of the inverter circuits. In addition, the second and third power converters 10_2 and 10_3 output the gate drive signals of low level to the output cutoff circuit 13 to cut off the electrical connection between the power conversion circuits 12 and the battery 100.

By the above-described drive control, the first power converter 10_1 performs the constant voltage charging operation solely to charge the battery 100.

Accordingly, as illustrated in FIG. 10, the battery 100 is charged with the output voltage Vout being kept constant, and the charging current Iot decreases as the time passes.

Continuously, the charge controller 20 monitors the operation period Td of the first power converter 10_1 (Yes in step S200), and determines that the operation period Td is equal to or longer than a predefined set period Ts (step S202). When the charge controller 20 determines that the operation period Td is equal to or longer than the predefined set period Ts (Yes in step S202), the charge controller 20 determines a power converter to solely operate next based on the order information and the operation information stored in the memory 22.

Figure 6:
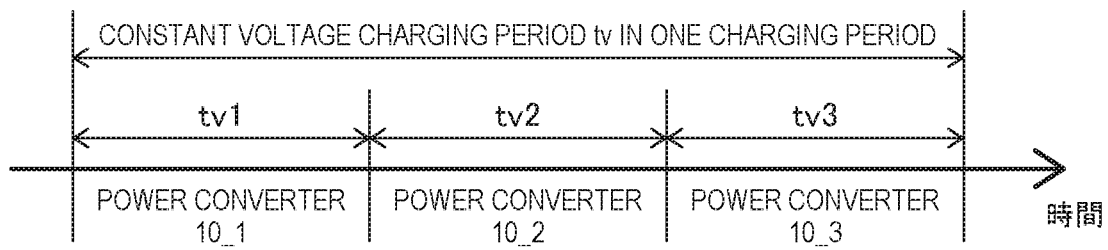
FIG. 6 is a view of an example of an operation period and an operation order of the power converter solely operating in the constant voltage charging operation in the first embodiment of the present invention.

The charge controller 20 recognizes that the first power converter 10_1 is solely operating currently from the operation information that has been read, and determines the second power converter 10_2 to solely operate next from the order information illustrated in FIG. 6. Then, the charge controller 20 outputs the voltage instruction value Vref (e. g., 100 V) and the drive instruction value fd "0" to the second power converter 10_2 (step S206). In addition, the charge controller 20 outputs the drive instruction value fd "1" to the first and third power converters 10_1 and 10_3 (step S208).

In other words, the charge controller 20 newly outputs the drive instruction value fd "1" to the first power converter 10_1, and continuously outputs the drive instruction value fd "1" to the third power converter 10_3.

Further, the charge controller 20 starts measuring the operation period Td of the second power converter 10_2, and in addition, updates the current operation information (i.e., identification information) with the identification information of the second power converter 10_2.

Accordingly, the second power converter 10_2 controls driving of the inverter circuit of the power inverter circuit 12 so that the output voltage Vout matches the voltage instruction value Vref (100 V).

On the other hand, in response to an input of the drive instruction value fd "1", the first power converter 10_1 outputs the gate drive signal of low level to all the field effect transistors of the inverter circuits of the power conversion circuits 12 to stop driving the inverter circuits. In addition, the first power converter 10_1 outputs the gate drive signal of low level to the output cutoff circuit 13 to cut off the electrical connection between the power inverter circuit 12 and the battery 100. Further, by continuously receiving the drive instruction value fd "1", the third power converter 10_3 outputs the gate drive signal of low level to all of the field effect transistors of the inverter circuit and the output cutoff circuit 13.

Accordingly, the second power converter 10_2 successively operates the constant voltage charging operation to charge the battery continuously with the output voltage Vout being kept constant, and the charging current Iot decrease as the time passes.

Subsequently, the charge controller 20 monitors the operation period Td of the second power converter 10_2 (Yes in step S200), and determines whether the operation period Td is equal to or longer than a predefined period Ts (step S202). Then, when the charge controller 20 determines that the operation period Td is equal to or longer than the predefined period Ts (Yes in step S202), the charge controller 20 determines a power converter to solely operate next based on the order information and the operation information stored in the memory 22.

The charge controller 20 recognizes that the second power converter 10_2 is solely operating currently from the operation information that has been read, and determines the third power converter 10_3 to solely operate next from the order information illustrated in FIG. 6.

Then, the charge controller 20 outputs the voltage instruction value Vref (100V) and the drive instruction value fd "0" to the third power converter 10_3 (step S206). In addition, the charge controller 20 outputs the drive instruction value fd "1" to the first and second power converters 10_1 and 10_2 (step S208).

In other words, the charge controller 20 newly outputs the drive instruction value fd "1" to the second ten power converter 10_2, and continuously outputs the drive instruction value fd "1" to the first power converter 10_1.

Also, since the third power converter 10_3 is the last power converter to solely operate, the charge controller 20 updates the current operation information with the identification information of the third power converter 10_3, without measuring the operation period.

Accordingly, the third power converter 10_3 successively operates the constant voltage charging operation to charge the battery with the output voltage Vout being kept constant continuously, and the charging current Iot decreases as the time passes. Then, when the constant voltage charge control process ends (Yes in step S106), the charge controller 20 performs the charging completion process (step S108).

Specifically, the charge controller 20 outputs the drive instruction value fd "1" to the third power converter 10_3 to continuously output the drive instruction value fd "1" to the first and second power converters 10_1 and 10_2.

Heretofore, the battery charger 1 in the first embodiment is configured such that the first to n-th power converters 10_1 to 10_n to operate in parallel in the constant current charging operation and the constant power charging operation, and one of the first to n-th power converters 10_1 to 10_n to solely operate in the constant voltage charging operation.

Accordingly, as compared to the configuration in which plural power converters operate in parallel, the power loss in the constant voltage charging operation can be reduced and the balance control of the output currents in the constant voltage charging operation can be eliminated.

In addition, each of the first to n-th power converters 10_1 to 10_n includes the constant current controller 110 configured to control the charging operation so that the output current value Io matches the current instruction value Iref, and the constant power controller 111 configured to control the charging operation so that the output power value Po matches the power instruction value Pref.

Therefore, the first to n-th power converters 10_1 to 10_n are capable of balancing the output currents Io1 to Ion in the constant current charging operation and the constant power charging operation, without comparing their output current values with the other output current values.

In addition, since the balance control of the output currents in the constant voltage charging operation is eliminated as described above, dedicated control circuits or control lines to balance the output currents in the constant voltage charging operation can be eliminated and hence an increase in cost can be suppressed.

Also, in the single operation period Tv of the constant voltage charging operation, the power converter to solely operate can be replaced with another one in turn whenever the predefined period Ts passes.

Accordingly, it is possible to avoid the situation in which loads are applied to only a particular power converter, and it is also possible to reduce a generation of the power loss caused by an uneven device degradation.

In the first embodiment, the first to n-th power converters 10_1 to 10_n correspond to plural power converters, and the charge controller 20 correspond to a charge controller.

Second Embodiment

Configuration

A second embodiment of the present invention is different from the first embodiment in that the operation control content of the power converter that operates solely in the constant voltage charging operation. In addition, the second embodiment is further different from the first embodiment in that the charge controller 20 does not include the timer 23, because the operation period Td of the power converter is not measured in the constant voltage charging operation. The other configurations are similar to those in the first embodiment, except for the above-described differences.

Hereinafter, in the second embodiment, descriptions of the same configurations as those in the first embodiment will be omitted appropriately with the same reference numerals applied, but different configurations will be described in detail.

Configuration of Charge Controller 20

Figure 7:
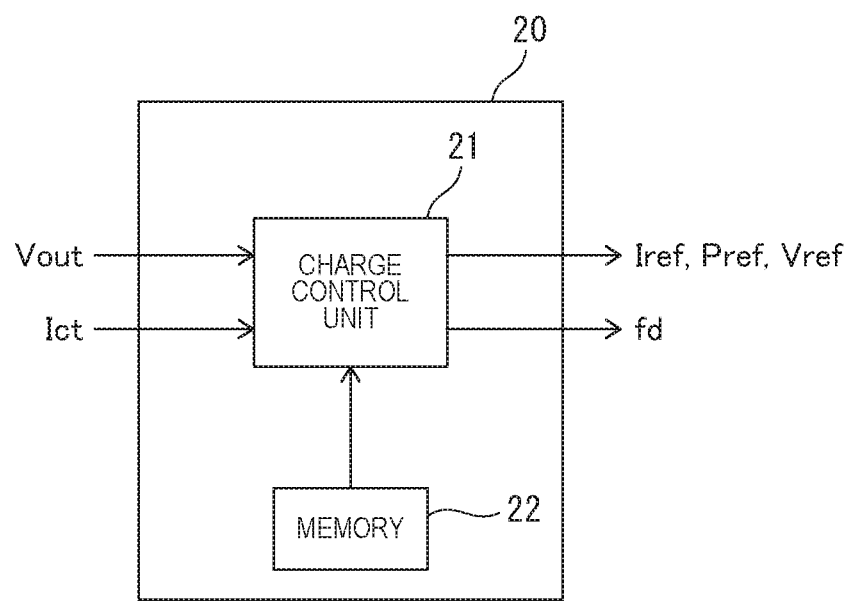
FIG. 7 is a block diagram of a specific configuration of a charge controller in a second embodiment of the present invention.

In the charge controller 20 in the second embodiment, as illustrated in FIG. 7, the timer 23 is omitted from the charge controller 20 in the above-described first embodiment.

The charge control unit 21 in the second embodiment is configured to replace the power converter to operate solely in the constant voltage charging operation period Tv with another power converter in a predefined order, in every charging period from the charging start to the charging end (full charge). In other words, in the second embodiment, an identical power converter solely operates in the whole period of the constant voltage charging operation period Tv in every charging period.

Such a predefined order for changing the power converter is set beforehand as order information in association with identification information of each power converter, and the order information is stored in the memory 22.

In addition, in the second embodiment, in the constant voltage charging operation, information on the power converter that has solely operated in each constant voltage charging operation period Tv is stored as operation history information in a non-volatile memory of the memory 22. The operation history information may be updated whenever the power converter is replaced, or may be additionally stored in the information on the past with time information. It is to be noted that until all the first to n-th power converters 10_1 to 10_n have successively operated once, a successive order is set not to select the power converter that has once operated solely again.

The memory 22 in the second embodiment includes a ROM in which programs and data necessary for the charge control process to be carried out by the charge control unit 21 is stored, and a non-volatile memory in which various data necessary for carrying out the program are temporarily stored.

To be specific, programs for the charging operation control process, the current instruction value Iref, the power instruction value Pref, the voltage instruction value Vref, the order information, and the like are stored in the ROM.

In addition, in the non-volatile memory in the second embodiment, various types of data are read from the ROM and stored temporarily, and in addition, the information on the power converter that has solely operated (operation history information) is stored.

Constant Voltage Charging Operation Control Process

Next, a process procedure of the constant voltage charging operation control process in the second embodiment will be described based on FIG. 8.

Figure 8:
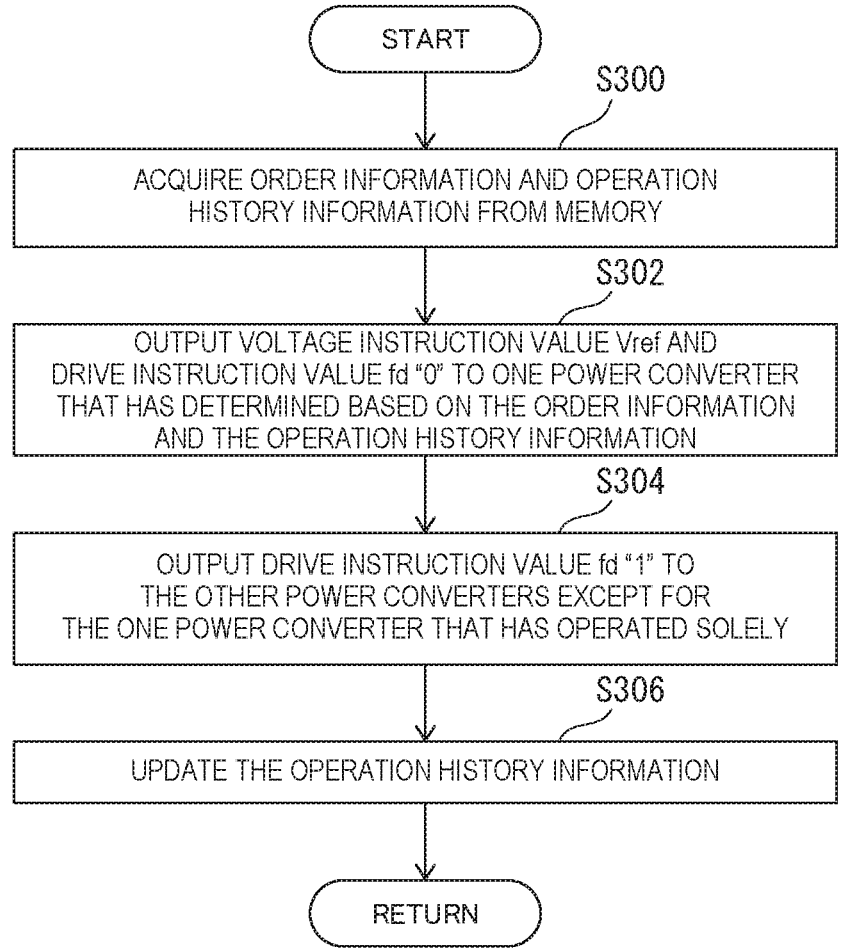
FIG. 8 is a flow chart of an example of a process procedure of a constant voltage charging operation control process in the second embodiment of the present invention.

When the charge control unit 21 starts performing the constant voltage charging operation control process, processing goes to step S300 firstly, as illustrated in FIG. 8.

In step S300, the charge control unit 21 reads the order information and the operation history information from the memory 22, and processing goes to step S302.

In step S302, the charge control unit 21 determines a power converter to solely operate from the first to n-th power converters 10_1 to 10_n based on the order information and the operation history information acquired in step S300. Then, the charge control unit 21 outputs the voltage instruction value Vref and the drive instruction value fd "0" to the power converter that has been determined. Then, processing goes to step S304.

Here, the charge control unit 21 determines another power converter, which is a next power converter indicated by the operation history information in the order defined in the order information, to be the next power converter to operate solely.

In step S304, the charge control unit 21 outputs the drive instruction value fd "1" to the other power converters except for the next power converter to operate solely determined in step S302, from the first to tenth power converters 10_1 to 10_n. Then, processing goes to step S306.

In step S306, the charge control unit 21 updates the operation history information stored in the memory 22 with the identification information of the power converter that has operated solely, ends a series of processes, and returns to an original process.

Operation

Figure 9:
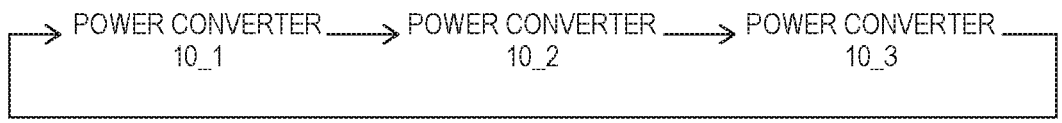
FIG. 9 is a view of an example of an operation order of the power converter solely operating in the constant voltage charging operation in the second embodiment of the present invention.

Next, an operation of the battery charger 1 in the second embodiment will be described by referring to FIG. 7 to FIG. 8 and FIG. 10, based on FIG. 9.

Hereinafter, an operation of the constant voltage charging operation control process will be described.

When the constant voltage charging operation control process starts, the charge controller 20 reads the order information and the operation history information from the memory 22 (step S300). The charge controller 20 recognizes the power converter that has previously operated the constant voltage charging operation from the operation history information, and determines the power converter to solely operate this time from the order information. Here, the order information is set as illustrated in FIG. 9 in an order of the first power converter 10_1, the second power converter 10_2, and the third power converter 10_3. After the third power converter 10_3, the order returns to the first power converter 10_1 again.

In this situation, it is assumed that the operation history information includes the identification information of the first power converter 10_1, as the power converter that has solely operated previously. In this case, the charge controller 20 determines the second power converter 10_2 to operate solely this time from the order information of FIG. 9. Then, the charge controller 20 outputs the voltage instruction value Vref (e.g., 100V) and the drive instruction value fd "0" to the second power converter 10_2 (step S302). Additionally, the charge controller 20 outputs the drive instruction value fd "1" to the first power converter 10_1 and the third power converter 10_3 (step S304).

Accordingly, the second power converter 10_2 controls driving of the inverter circuit of the power conversion circuit 12 so that the output voltage Vout matches the voltage instruction value Vref (100 V).

On the other hand, in response to an input of the drive instruction value fd "1", the first and third power converters 10_1 and 10_3 respectively output the gate drive signals of low level to all of the field effect transistors of the inverter circuits of the power conversion circuits 12 to stop the driving of the inverter circuits. In addition, the first and third power converters 10_1 and 10_3 respectively output the gate drive signals of low level to the output cutoff circuit 13 to cut off the electrical connection between the power conversion circuits 12 and the battery 100.

By the above-described drive control, the second power converter 10_2 performs the constant voltage charging operation solely to charge the battery 100.

Accordingly, as illustrated in FIG. 10, the battery 100 is charged with the output voltage Vout being kept constant, and the charging current Iot decreases as the time passes. Then, when the constant voltage charging operation control process ends (Yes in step S106), the charge controller 20 performs a charging completion process (step S108).

After that, whenever the constant voltage charging operation is newly performed, the power converter to solely operate is replaced in the order of the third power converter 10_3, the first power converter 10_1, and the second power converter 10_2, for controlling the operation similarly as described above.

Heretofore, the battery charger 1 in the second embodiment is configured such that the first to n-th power converters 10_1 to 10_n to operate in parallel in the constant current charging operation and the constant power charging operation, and to cause one of the first to n-th power converters 10_1 to 10_n to solely operate in the constant voltage charging operation.

Accordingly, as compared to the configuration in which plural power converters operate in parallel, the power loss in the constant voltage charging operation can be reduced and the balance control of the output currents in the constant voltage charging operation can be eliminated.

In addition, each of the first to n-th power converters 10_1 to 10_n is configured to include the constant current controller 110 configured to control the charging operation so that the output current value Io matches the current instruction value Iref, and the constant power controller 111 configured to control the charging operation so that the output power value Po matches the power instruction value Pref.

Accordingly, the first to n-th power converters 10_1 to 10_n are capable of balancing the output currents Io1 to Ion in the constant current charging operation and the constant power charging operation, without comparing the output current values of their own with the other output current values.

In addition, since the balance control of the output currents in the constant voltage charging operation is eliminated as described above, no dedicated control circuit or no dedicated control line to balance the output currents is needed in the constant voltage charging operation, and hence an increase in cost can be suppressed.

Also, the power converter to solely operate can be replaced with another one in turn for every charging period.

Accordingly, it is possible to avoid the situation in which only a particular power converter can receive a load, and it is also possible to reduce a generation of the power loss caused by an uneven device degradation.

In the second embodiment, the first to n-th power converters 10_1 to 10_n correspond to plural power converters, and the charge controller 20 corresponds to a charge controller.

Modification Examples (1) In the above-described first embodiment, in a single constant power charging period Tv, the first to n-th power converters 10_1 to 10_n are configured such that the power converter to solely operate is successively replaced for every predefined period Ts. Also, in the above-described second embodiment, the power converter to solely operate is successively replaced for every constant power charging period. The present invention is not limited to the above configurations, and may be configured such that a specific power converter solely operates, the operation period is changed depending on a degradation state, or when there are lots of power converters, the power converters are divided into plural groups and each of the groups is successively replaced for a single constant power charging period.

(2) In each of the above-described embodiments, three types of charging operations including the constant current charging operation, the constant power charging operation, and the constant voltage charging operation are performed as the charging operations. However, the present invention is not limited to such a configuration. For example, other configurations may be applicable such that two types of the charging operations including the constant current charging operation and the constant voltage charging operation are performed, or a soft start charging operation to prevent a rush current (for example, an operation of charging the battery with a relatively small constant current) is performed before the constant current charging operation.

(3) In each of the above-described embodiments, the battery 100 to be charged is a lithium ion battery. However, the present invention is not limited to such a configuration, and the present invention may be applicable to another type of battery, if the battery is chargeable by performing at least the constant current charging operation and the constant voltage charging operation.

(4) In each of the above-described embodiments, the cutoff circuit 13 is included to cut off the electrical connection between the power conversion circuit 12 and the battery 100. However, the present invention is not limited to such a configuration, and another power cut off circuit configured to cut off the electrical connection between the power supply and the power conversion circuit 12.

(5) In each of the above-described embodiments, when driving of the power converter is stopped, the driving of the inverter circuit of the power conversion circuit 12 is stopped, and in addition, the output cutoff circuit 13 is cut off. However, the present invention is not limited to such a configuration, and for example, only the output cutoff circuit 13 may be cut off, or when the power cutoff circuit is provided in addition to the output cutoff circuit 13, only the output cutoff circuit 13 and the power supply cutoff circuit may be cut off.

(6) In each of the above-described embodiments, when the driving of the power converter is stopped, the driving of the inverter circuit of the power conversion circuit 12 is stopped, and the output cutoff circuit 13 cuts off the electrical connection between the power converter and the battery 100. However, the present invention is not limited to such a configuration, and for example, the output cutoff circuit 13 may be eliminated in a configuration of merely stopping the driving of the inverter circuit of the power conversion circuit 12.

(7) In each of the above-described embodiments, the operation control device 11 includes a micon, and a processor carries out the programs for various operation processes. However, the present invention is not limited to such a configuration, and for example, another configuration may be applicable such that each functional unit is configured with an electronic circuit, without including the micon.

Further, the above-described embodiments are merely examples of the present invention, and various technical limitations are applied. However, the scope of the present invention is not limited to the above-described embodiments, unless there is a description that the present invention is limited in particular. Further, the drawings and figures used in the above description are schematic views with the reduction scales in the length and breadth of members or parts being different from those in reality. Further, the present invention is not limited to the above-described embodiments, and modifications, improvements, and equivalents are included in the present invention in the scope where an object of the present invention is achievable.

REFERENCE SIGNS LIST

1 . . . battery charger, 10_1 to 10_n . . . first to n-th power converters, 11 . . . operation control device, 11a . . . microcomputer, 11b . . . drive circuit, 12 . . . power conversion circuit, 13 . . . output cutoff circuit, 20 . . . charging controller, 21 . . . charging control unit, 22 . . . memory, 23 . . . timer, 100 . . . battery, CS1 to CSn . . . current detection circuit, CtS . . . charging current detection circuit, VcS . . . Voltage detection circuit

The invention claimed is:

1. A battery charger comprising:
a plurality of power converters configured to convert power supplied from a power supply, and to supply converted power to a battery; and
a charge controller configured to cause the plurality of power converters to operate at least two charging operations selected from a constant current charging operation to keep a charging current constant, a constant power charging operation to keep a charging power constant, or a constant voltage charging operation to charge the battery with a constant charging voltage while the charging current decreases, to charge the battery, the at least two charging operations including at least the constant voltage charging operation,
wherein the charge controller is configured to cause the plurality of power converters to operate in parallel, in performing the at least two charging operations including either one of the constant current charging operation or the constant power charging operation,
wherein the charge controller is configured to cause any one of the plurality of power converters to solely operate in the constant voltage charging operation, and
wherein the charge controller is configured to replace one of the plurality of power converters to solely operate with another one of the plurality of power converters in turn for every predefined period, in the constant voltage charging operation for a charging period from a charging start to a charging end.

2. A battery charger comprising:

a plurality of power converters configured to convert power supplied from a power supply, and to supply converted power to a battery; and a charge controller configured to cause the plurality of power converters to operate at least two charging operations selected from a constant current charging operation to keep a charging current constant, a constant power charging operation to keep a charging power constant, or a constant voltage charging operation to charge the battery with a constant charging voltage while the charging current decreases, to charge the battery, the at least two charging operations including at least the constant voltage charging operation, wherein the charge controller is configured to cause the plurality of power converters to operate in parallel, in performing the at least two charging operations including either one of the constant current charging operation or the constant power charging operation, wherein the charge controller is configured to cause any one of the plurality of power converters to solely operate in the constant voltage charging operation, and wherein the charge controller is configured to replace one of the plurality of power converters to solely operate with another one of the plurality of power converters in turn for every charging period from a charging start to a charging end.

3. The battery charger according to claim 1, wherein the charge controller is configured to output at least two instruction values corresponding to the at least two charging operations to the plurality of power converters to control charging operations of the plurality of power converters, the at least two instruction values including a current instruction value corresponding to the constant current charging operation, a power instruction value corresponding to the constant power charging operation, and a voltage instruction value corresponding to the constant voltage charging operation, wherein each of the plurality of power converters comprises at least two control units corresponding to the at least two charging operations, the at least two control units being selected from:

a constant current control unit configured to control the constant current charging operation such that an output current value from the constant current control unit matches the current instruction value output from the charge controller, based on the current instruction value from the charge controller and the output current value;

a constant power control unit configured to control the constant power charging operation such that an output power value from the constant power control unit matches the power instruction value output from the charge controller, based on the power instruction value from the charge controller and the output power value; and a constant voltage control unit configured to control the constant voltage charging operation such that an output voltage value from the constant voltage control unit matches the voltage instruction value output from the charge controller, based on the voltage instruction value from the charge controller and the output voltage value.

4. The battery charger according to claim 1, wherein the battery is a lithium ion battery, and wherein the charge controller is configured to cause the plurality of power converters to perform in an order of the constant current charging operation and the constant voltage charging operation, or in another order of the constant current charging operation, the constant power charging operation, and the constant voltage charging operation, to charge the battery.

5. The battery charger according to claim 2, wherein the battery is a lithium ion battery, and wherein the charge controller is configured to cause the plurality of power converters to perform in an order of the constant current charging operation and the constant voltage charging operation, or in another order of the constant current charging operation, the constant power charging operation, and the constant voltage charging operation, to charge the battery.

6. The battery charger according to claim 3, wherein the battery is a lithium ion battery, and wherein the charge controller is configured to cause the plurality of power converters to perform in an order of the constant current charging operation and the constant voltage charging operation, or in another order of the constant current charging operation, the constant power charging operation, and the constant voltage charging operation, to charge the battery.

* * * * *